(12) United States Patent
Popper et al.

(10) Patent No.: US 8,746,935 B2
(45) Date of Patent: Jun. 10, 2014

(54) ADAPTER LENS

(75) Inventors: Richard S. Popper, Scottsdale, AZ (US); Jensen Jorgensen, Scottsdale, AZ (US)

(73) Assignee: XGlow P/T, LLC, Scottsdale, AZ (US)

( * ) Notice: Subject to any disclaimer, the term of this patent is extended or adjusted under 35 U.S.C. 154(b) by 0 days.

(21) Appl. No.: 13/569,953

(22) Filed: Aug. 8, 2012

(65) Prior Publication Data

US 2014/0043830 A1    Feb. 13, 2014

(51) Int. Cl.
  *F21V 5/04*       (2006.01)
(52) U.S. Cl.
  USPC .................. 362/327; 362/311.06; 362/311.12; 362/311.09; 362/311.1
(58) Field of Classification Search
  USPC ............... 362/327, 309, 310, 311.06, 311.12, 362/311.09, 311.1
  See application file for complete search history.

(56) References Cited

U.S. PATENT DOCUMENTS

| | | | | |
|---|---|---|---|---|
| 2,215,900 A | * | 9/1940 | Bitner | 362/309 |
| 2,469,080 A | * | 5/1949 | Rosin et al. | 362/327 |
| 5,042,928 A | * | 8/1991 | Richards | 359/728 |
| 7,411,742 B1 | * | 8/2008 | Kim et al. | 359/718 |
| 7,461,960 B2 | | 12/2008 | Opolka et al. | |

* cited by examiner

*Primary Examiner* — Sharon Payne
(74) *Attorney, Agent, or Firm* — Stephen C. Beuele; Procopio Cory Hargreaves & Savitch LLP

(57) ABSTRACT

An adapter lens includes an inner converging lens part; a convex light output region; a front conical light output region; an outer reflector part; a rearwardly open blind hole defining surface including a flat base surface and a frustoconical side surface that together define a light incidence region and a frustoconical hole having an inner end diameter, an outer end diameter, and allowing for longitudinal movement therein of a LED light source along an optical axis of the adapter lens within the frustoconical hole for changing a light cone emitted from the adapter lens. The adapter lens has a height H and a maximum diameter MD, and the ratio of the height H to the maximum diameter MD is greater than 0.5.

28 Claims, 3 Drawing Sheets

ADAPTER LENS

FIELD OF THE INVENTION

The present invention relates, in general, to optical lenses, and, in particular, to optical lenses for flashlights.

BACKGROUND OF THE INVENTION

U.S. Pat. No. 7,461,960 to Opolka, et al. ("Opolka Lens") discloses a LED illumination module with a rotationally symmetrical, one-piece, light-transparent adapter lens that has an inner converging lens part and an outer reflector part and a rearwardly open blind hole that is defined by a beveled or frustoconical surface with arcuate profile and a convex base surface and that has an inner diameter allowing for axial movement of a LED body within the opening along the optical axis of the adapter lens. The LED illumination module allows longitudinal and axial movement of the whole arrangement consisting of the LED glass body and the base in the blind hole-like bore, so that, by a relative movement of the LED to the blind hole-like bore along the optical axis, different emission characteristics with different cone angles of the light emission pencils can be variably set.

SUMMARY OF THE INVENTION

An aspect of the invention involves an adapter lens including an inner converging lens part; a convex light output region; a front conical light output region; an outer reflector part; a rearwardly open blind hole defining surface including a flat base surface and a frustoconical side surface that together define a light incidence region and a frustoconical hole having an inner end diameter, an outer end diameter, and allowing for longitudinal movement therein of a LED light source along an optical axis of the adapter lens within the frustoconical hole for changing a light cone emitted from the adapter lens caused by light rays from the LED light source refracted by the inner converging lens part, reflected by the outer reflector part, and transmitted through the convex light output region and front conical light output region, wherein the adapter lens has a height H and a maximum diameter MD, and the ratio of the height H to the maximum diameter MD is greater than 0.5

One or more implementations of the aspect of the invention described immediately above include one or more of the following: the ratio of the height H to the maximum diameter MD is greater than 0.55; the ratio of the height H to the maximum diameter MD is greater than 0.6; the frustoconical hole has a depth D, and the ratio of the maximum diameter MD to depth D is less than 5.3; the frustoconical hole has a depth D, and the ratio of the maximum diameter MD to depth D is less than 4.9; the frustoconical hole has a depth D, and the ratio of the maximum diameter MD to depth D is less than 4.5; the frustoconical hole has a depth D, and the ratio of the maximum diameter MD to depth D is less than 4.1; the front conical light output region includes a curved annular front wall that radiates from the convex light output region and curves upwardly and outwardly in a non-linear configuration; the outer reflector part includes a curved outer annular surface that radiates from the frustoconical hole and curves upwardly and outwardly in a non-linear configuration; the front conical light output region extends at a tilt angle α of less than 35 degrees relative to a perpendicular from the optical axis; the front conical light output region extends at a tilt angle α of less than 32 degrees relative to a perpendicular from the optical axis; the front conical light output region extends at a tilt angle α of less than 29 degrees relative to a perpendicular from the optical axis; the convex light output region has an apex angle β of less than 38 degrees relative to a perpendicular from the optical axis; the convex light output region has an apex angle β of less than 32 degrees relative to a perpendicular from the optical axis; the convex light output region has an apex angle β of less than 26 degrees relative to a perpendicular from the optical axis; the convex light output region has a depth T, and the ratio of the maximum diameter MD to depth T is more than 7.0; the convex light output region has a depth T, and the ratio of the maximum diameter MD to depth T is more than 8.5; the convex light output region has a depth T, and the ratio of the maximum diameter MD to depth T is more than 10.0; the front conical light output region terminates into an outwardly extending ledge that protrudes radially outwardly from the front conical light output region; the adapter lens includes a length H and the total length of the adapter lens is greater than 17 mm; the adapter lens includes a length H and the total length of the adapter lens is greater than 20 mm; the adapter lens includes a length H and the total length of the adapter lens is greater than 23 mm; the inner converging lens part includes a diameter d and the frustoconical hole includes a largest diameter LD, and the diameter d is more than 1 mm larger than the largest diameter LD; the inner converging lens includes a thickness T and the adapter lens has a length H, and the ratio of the thickness T to the length H is less than 0.55; the inner converging lens includes a thickness T and the adapter lens has a length H, and the ratio of the thickness T to the length H is less than 0.4; the inner converging lens includes a thickness T and the adapter lens has a length H, and the ratio of the thickness T to the length H is less than 0.25; the inner converging lens part includes a diameter d and the adapter lens includes a maximum diameter MD, and the ratio between the diameter d to the maximum diameter MD is less than 0.5; the inner converging lens part includes a diameter d and the adapter lens includes a maximum diameter MD, and the ratio between the diameter d to the maximum diameter MD is less than 0.46; the inner converging lens part includes a diameter d and the adapter lens includes a maximum diameter MD, and the ratio between the diameter d to the maximum diameter MD is less than 0.42.

DETAILED DESCRIPTION OF THE PREFERRED EMBODIMENTS

Figure 1:
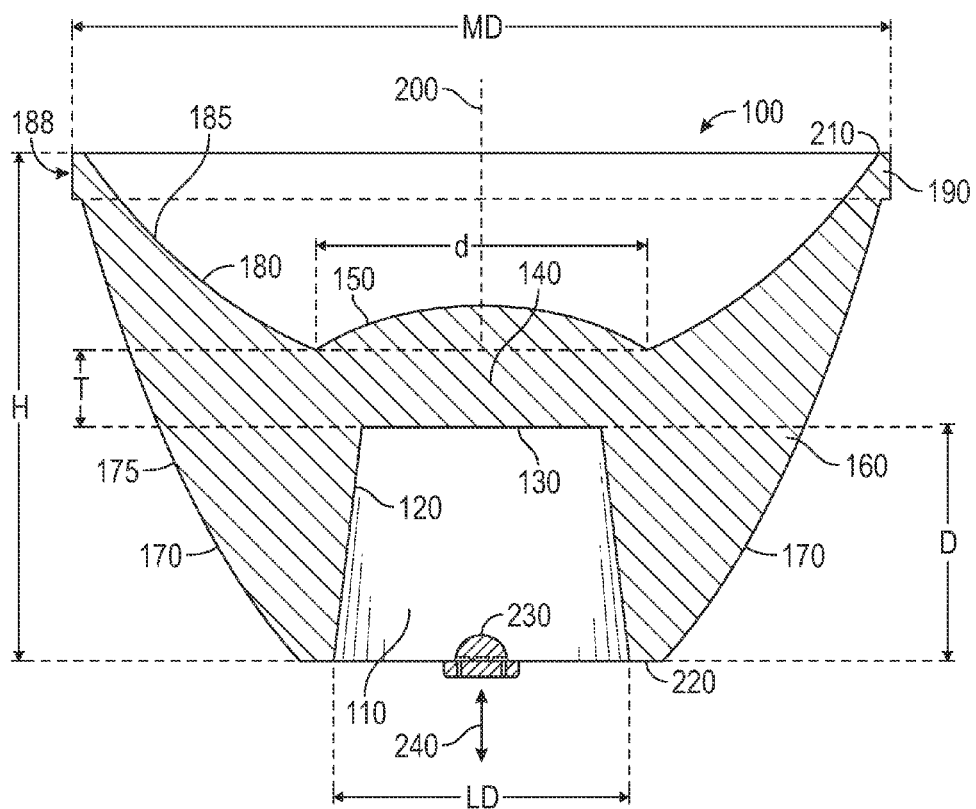
FIG. 1 is a cross sectional view of a lens in accordance with an embodiment of the invention.
Figure 2A:
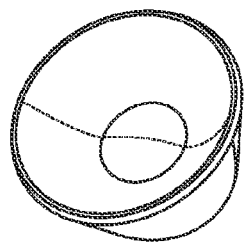
FIGS. 2A-2H are front perspective, rear perspective, rear elevational, front elevational, bottom plan, top plan, left elevational, and right elevational views of the lens of FIG. 1.
Figure 2B:
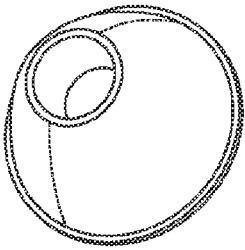
Figure 2C:
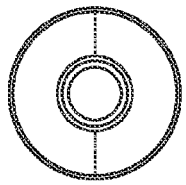
Figure 2D:
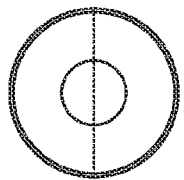
Figure 2E:
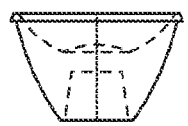
Figure 2F:
Figure 2G:
Figure 2H:

Turning now to the drawings, in which like reference characters indicate corresponding elements throughout the several views, an adapter lens 100 for a flashlight is disclosed. In alternative applications, the adapter lens 100 is used in other applications, other than for a flashlight. The lens 100 includes a rearward open frustoconical blind hole 110, a frustoconical side surface (light incidence region) 120, a flat base surface 130, an inner converging lens 140, a convex light output region 150, a reflector part 160, an outer annular surface 170 with a curved outer annular surface 175 that radiates from the frustoconical hole 110 and curves upwardly and outwardly in a non-linear configuration, a front conical light output region 180 with a curved annular front wall 185 that radiates from the convex light output region 150 and curves upwardly and outwardly in a non-linear configuration, an outwardly extending/protruding ledge 188 with an edge 190 for mounting, an optical axis 200, a front edge surface 210, a rear edge surface 220, and a LED light source 230 that moves in the direction of arrow 240 inside rearward open blind hole 110. The overall structural characteristics of the lens 100 allows the lens 100 to outperform flashlight adapter lenses in the past because the lens 100 provides an ideal even, uniform hot spot when focused in, but at the same time, provides a very even full light without dark circles when focused out to flood.

The adapter lens 100 acts as a lens body. The rearward open blind hole 110 is defined by the frustoconical side surface 120 and the flat base surface 130 all centered on the optical axis 200. The flat base surface 130 is also the light incidence region of the inner converging lens 140, which includes the convex light output region 150 on a front face. The flat base surface 130 allows the adapter lens 100 to provide a bright hotspot beam when the beam angle is narrow (e.g., FIG. 4) and create an even, light beam circle, reducing most dark spots, when the beam angle is wide (e.g., FIG. 5). The converging lens 140 is surrounded by the reflector part 160 that is essentially formed by the surface 120 as light incidence region as well as by the outer annular surface 170, which totally reflects light, and by the front conical light output region 180. As shown, the reflector part 160 can also have the annular extended lens edge 190 for mounting the adapter lens 100 in the head of a flashlight. The annular extended lens edge 190 extends substantially parallel to the optical axis 200. Front edge surface 210 and rear edge surface 220 extend perpendicular to the optical axis 200.

The rearward conical open blind is so wide or the diameter of the opening is so large that the LED 230 can be moved along the optical axis 200 in the direction of the double arrow 240.

Figure 4:
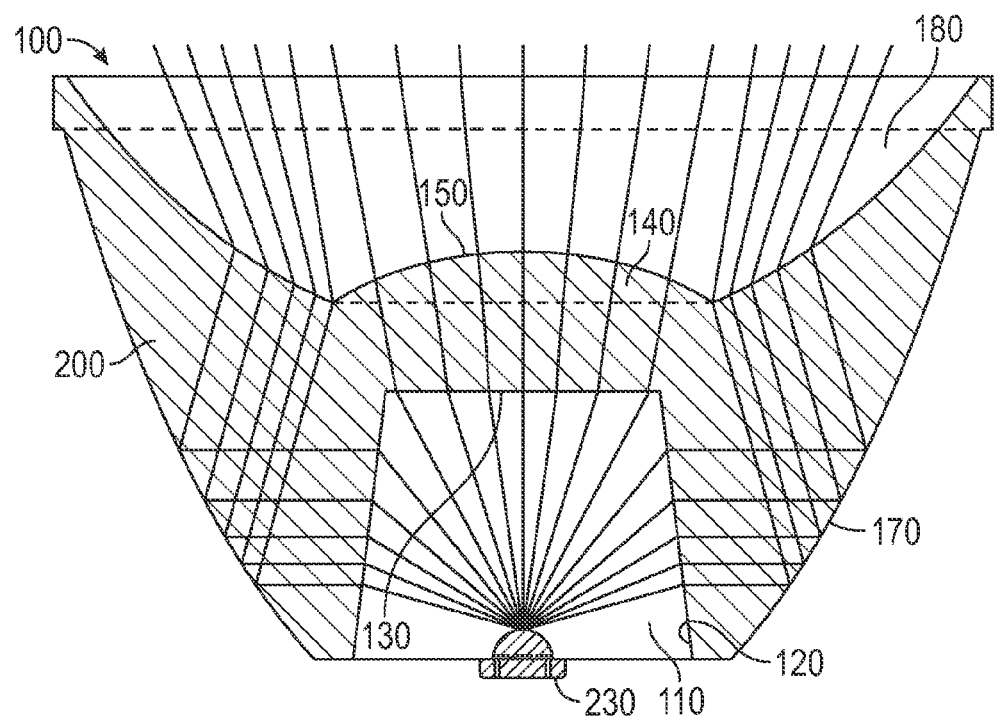
FIG. 4 is a cross sectional view of the lens similar to that shown in FIG. 1 and shows the emission characteristics of the lens when the LED is disposed at an entrance of a rearward open blind hole of the lens.
Figure 5:
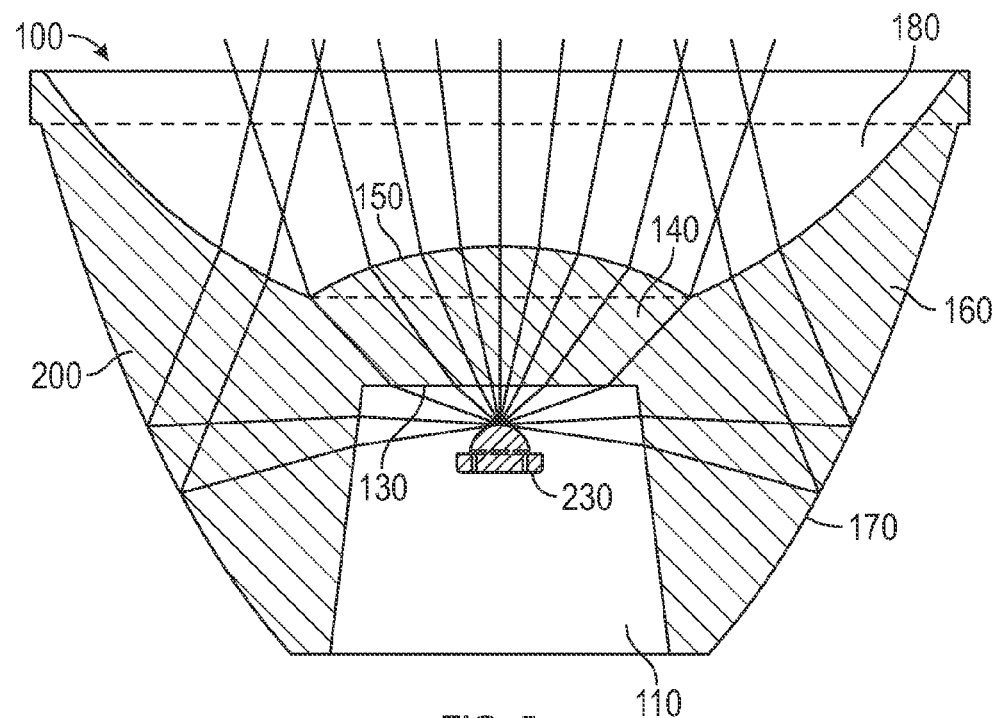
FIG. 5 is a cross sectional view of the lens similar to that shown in FIG. 1 and shows the emission characteristics of the lens when the LED is disposed in the rearward open blind hole of the lens, near a flat base surface of the lens.

Different emission characteristics are shown in FIGS. 4 and 5. A relatively narrow beam is achieved with a setting according to FIG. 4, when the LED 230 is disposed at the entrance of the rearward open blind hole 110 of the lens 100. The light emitted by the LED 230 is refracted when it meets the flat base surface/light incidence region 130 and, after a second light refraction, leaves the inner converging lens 140 through the convex light output region 150. The frustoconical side surface 120 refracts the edge rays onto the outer annual surfaces 170, where they are totally reflected and finally leave to the front after refraction from the front conical light output region 180. The emission characteristic obtained with the adapter lens 100 and the LED 230 in the shown position, consists in a relatively narrow light cone with small cone angle. With the relatively narrow light cone, the structural characteristics of the lens 100 enables the lens 100 to provide a much more even, uniform light compared to the Opolka Lens and at the same time creating a bright "hotspot". Prior lenses with the LED or light source in this position created many dark rings in parts of the light beam.

In the position of the LED 230 according to FIG. 5, in which the LED 230 is moved further forward into the hole 110 (near the flat base surface 130 or closer to the flat base surface 130 than the rear edge surface 220), the light rays refracted by the inner converging lens 140 diverge and the light rays deriving from the reflector part 160 converge, which is due to different calculation and reflection angles. The emission characteristic obtained with the adapter lens 100 and the LED 230 in the shown position, consists in a relatively wide light cone with large cone angle. With the relatively wide light cone, the structural characteristics of the lens 100 enables the lens 100 to provide a much more even, uniform light compared to the Opolka Lens. Prior lenses with the LED or light source in this position created many dark rings in parts of the light beam.

Figure 3:
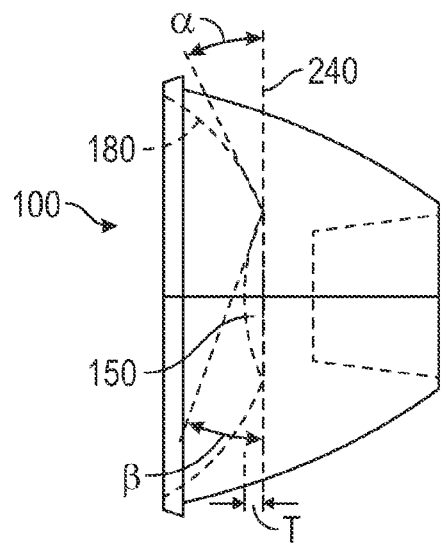
FIG. 3 is a right elevational view of the lens of FIG. 1 and shows a tilt angle α and an apex angle β of the lens.

As shown in FIG. 3, the front conical light output region 180 extends at a tilt angle α of 25.33 degrees relative to a perpendicular 240 from the optical axis 200. In a preferred embodiment of the invention, the front conical light output region 180 extends at a tilt angle α of more than 25 degrees and less than 35 degrees relative to a perpendicular from the optical axis 200. In a more preferred embodiment; the front conical light output region 180 extends at a tilt angle α of less than 32 degrees relative to a perpendicular from the optical axis 200. In a most preferred embodiment, the front conical light output region 180 extends at a tilt angle α of less than 29 degrees relative to a perpendicular from the optical axis 200.

In addition, the forwardly directed convex light output region 150 is shown with an apex angle β of 20.2 degrees. In a preferred embodiment of the invention, the convex light output region 150 has an apex angle β of less than 38 degrees relative to a perpendicular from the optical axis 200. In a more preferred embodiment of the invention, the convex light output region 150 has an apex angle β of less than 32 degrees relative to a perpendicular from the optical axis 200. In a most preferred embodiment of the invention, the convex light output region 150 has an apex angle β of less than 26 degrees relative to a perpendicular from the optical axis 200.

The adapter lens 100 has a maximum diameter MD and a length H, and the ratio of the length H of the adapter lens 100 to its maximum diameter MD is preferably 0.50-0.62. In an exemplary embodiment, the ratio of the length H of the adapter lens 100 to its maximum diameter MD is greater than 0.5. In more preferred embodiment, the adapter lens 100 has a maximum diameter MD and a length H, and the ratio of the length H of the adapter lens 100 to its maximum diameter MD is greater than 0.55. In a most preferred embodiment, the adapter lens 100 has a maximum diameter MD and a length H, and the ratio of the length H of the adapter lens 100 to its maximum diameter MD is greater than 0.6.

In an embodiment of the invention, the frustoconical hole has a depth D, and the ratio of the maximum diameter MD to depth D is less than 5.3. In more preferred embodiment, the frustoconical hole has a depth D, and the ratio of the maximum diameter MD to depth D is less than 4.9. In a still more preferred embodiment, the frustoconical hole has a depth D, and the ratio of the maximum diameter MD to depth D is less than 4.5. In a most preferred embodiment, the frustoconical hole has a depth D, and the ratio of the maximum diameter MD to depth D is less than 4.1.

In an embodiment of the invention, the convex light output region 150 has a thickness/depth T, and the ratio of the maximum diameter MD to depth T is more than 7.0. In more preferred embodiment, the convex light output region 150 has a depth T, and the ratio of the maximum diameter MD to depth T is more than 8.5. In a most preferred embodiment, the convex light output region has a depth T, and the ratio of the maximum diameter MD to depth T is more than 10.0.

The lens 100 preferably has a length H of 12-25 mm.

In a 40 mm lens embodiment of the invention, the adapter lens includes a length H of 25 mm. In a preferred embodiment, the total length of the adapter lens is greater than 17 mm. In more preferred embodiment, the adapter lens includes a length H and the total length of the adapter lens is greater than 20 mm. In a most preferred embodiment, the adapter lens includes a length H and the total length of the adapter lens is greater than 23 mm.

In a 30 mm lens embodiment of the invention, the adapter lens includes a length H of 15.5 mm. In a preferred embodiment, the total length of the adapter lens is greater than 12 mm. In more preferred embodiment, the adapter lens includes a length H and the total length of the adapter lens is greater than 13 mm. In a most preferred embodiment, the adapter lens includes a length H and the total length of the adapter lens is greater than 14 mm.

In an embodiment of the invention, the inner converging lens part 140 includes a diameter d and the frustoconical hole 110 includes a largest diameter LD, and the diameter d is more than 1 mm larger than the largest diameter LD.

In an embodiment of the invention, the inner converging lens 140 includes a thickness T and the adapter lens 100 has a length H, and the ratio of the thickness T to the length H is less than 0.55. In more preferred embodiment, the inner converging lens 140 includes a thickness T and the adapter lens 100 has a length H, and the ratio of the thickness T to the length H is less than 0.4. In a most preferred embodiment, the inner converging lens 140 includes a thickness T and the adapter lens 100 has a length H, and the ratio of the thickness T to the length H is less than 0.25.

In an embodiment of the invention, the inner converging lens part 140 includes a diameter d and the adapter lens 100 includes a maximum diameter MD, and the ratio between the diameter d to the maximum diameter MD is 0.4-0.52. In a preferred embodiment, the ratio between the diameter d to the maximum diameter MD is less than 0.5. In more preferred embodiment, the inner converging lens part 140 includes a diameter d and the adapter lens 100 includes a maximum diameter MD, and the ratio between the diameter d to the maximum diameter MD is less than 0.46. In a most preferred embodiment, the inner converging lens part 140 includes a diameter d and the adapter lens 100 includes a maximum diameter MD, and the ratio between the diameter d to the maximum diameter MD is less than 0.42.

In an embodiment of the invention, the ratio of the thickness T of the inner converging lens 140 to the length H of the adapter lens 100 is 0.15-0.60. In a preferred embodiment, the ratio of the thickness T of the inner converging lens 140 to the length H of the adapter lens 100 is less than 0.6. In a more preferred embodiment, the ratio of the thickness T of the inner converging lens 140 to the length H of the adapter lens 100 is less than 0.45. In a most preferred embodiment, the ratio of the thickness T of the inner converging lens 140 to the length H of the adapter lens 100 is less than 0.30.

While illustrative embodiments of the invention are disclosed herein, it will be appreciated that numerous modifications and other embodiments can be devised by those skilled in the art. Features of the embodiments described herein, can be combined, separated, interchanged, and/or rearranged to generate other embodiments. Therefore, it will be understood that the appended claims are intended to cover all such modifications and embodiments that come within the spirit and scope of the present invention.

What is claimed is:

1. An adapter lens, comprising:
   an inner converging lens part;
   a convex light output region;
   a front conical light output region;
   an outer reflector part;
   a rearwardly open blind hole defined by a surface including a flat base surface between a frustoconical side surface, that together define a light incidence region and a frustoconical hole having an inner end diameter along the flat base surface, and an outer end diameter, and the frustoconical hole configured for allowing longitudinal movement of a light emitting diode (LED) light source along an optical axis within the frustoconical hole for moving the focal point of the adapter lens and correspondingly dimensionally changing a light cone emitted from the adapter lens caused by light rays from the LED light source, the light rays being refracted by the inner converging lens part, reflected by the outer reflector part, and transmitted through the convex light output region and front conical light output region; and,
   the adapter lens has a height H and a maximum diameter MD, and the ratio of the height H to the maximum diameter MD is greater than 0.5, and, a cross-sectional view of the adapter lens the front conical light output region includes a curved annular front wall of a single curvature with a slope that radiates from the convex light output region and curves upwardly and outwardly in a non-linear configuration.

2. The adapter lens of claim 1, wherein the ratio of the length H to the maximum diameter MD is greater than 0.55.

3. The adapter lens of claim 1, wherein the ratio of the length H to the maximum diameter MD is greater than 0.6.

4. The adapter lens of claim 1, wherein the frustoconical hole has a depth D, and the ratio of the maximum diameter MD to depth D is less than 5.3.

5. The adapter lens of claim 1, wherein the frustoconical hole has a depth D, and the ratio of the maximum diameter MD to depth D is less than 4.9.

6. The adapter lens of claim 1, wherein the frustoconical hole has a depth D, and the ratio of the maximum diameter MD to depth D is less than 4.5.

7. The adapter lens of claim 1, wherein the frustoconical hole has a depth D, and the ratio of the maximum diameter MD to depth D is less than 4.1.

8. The adapter lens of claim 1, wherein the outer reflector part includes a curved outer annular surface that radiates from the frustoconical hole and curves upwardly and outwardly in a non-linear configuration.

9. The adapter lens of claim 1, wherein the front conical light output region extends at a tilt angle a of more than 25 degrees and less than 35 degrees relative to a perpendicular from the optical axis and the adapter lens includes a length H of 12-25 mm.

10. The adapter lens of claim 1, wherein the front conical light output region extends at a tilt angle a of more than 25 degrees and less than 32 degrees relative to a perpendicular from the optical axis and the adapter lens includes a length H of 12-25 mm.

11. The adapter lens of claim 1, wherein the front conical light output region extends at a tilt angle a of more than 25 degrees and less than 29 degrees relative to a perpendicular from the optical axis and the adapter lens includes a length H of 12-25 mm.

12. The adapter lens of claim 1, wherein the convex light output region has an apex angle β of less than 38 degrees relative to a perpendicular from the optical axis.

13. The adapter lens of claim 1, wherein the convex light output region has an apex angle β of less than 32 degrees relative to a perpendicular from the optical axis.

14. The adapter lens of claim 1, wherein the convex light output region has an apex angle β of less than 26 degrees relative to a perpendicular from the optical axis.

15. The adapter lens of claim 1, wherein the convex light output region has a depth T, and the ratio of the maximum diameter MD to depth T is more than 7.0.

16. The adapter lens of claim 1, wherein the convex light output region has a depth T, and the ratio of the maximum diameter MD to depth T is more than 8.5.

17. The adapter lens of claim 1, wherein the convex light output region has a depth T, and the ratio of the maximum diameter MD to depth T is more than 10.0.

18. The adapter lens of claim 1, wherein the front conical light output region terminates into an outwardly extending ledge that protrudes radially outwardly from the front conical light output region.

19. The adapter lens of claim 1, wherein adapter lens includes a length H and the total length of the adapter lens is greater than 17 mm.

20. The adapter lens of claim 1, wherein adapter lens includes a length H and the total length of the adapter lens is greater than 20 mm.

21. The adapter lens of claim 1, wherein adapter lens includes a length H and the total length of the adapter lens is greater than 23 mm.

22. The adapter lens of claim 1, wherein the inner converging lens part includes a diameter d and the frustoconical hole includes a largest diameter LD, and the diameter d is more than 1 mm larger than the largest diameter LD.

23. The adapter lens of claim 1, wherein the inner converging lens includes a thickness T and the adapter lens has a length H, and the ratio of the thickness T to the length H is less than 0.55.

24. The adapter lens of claim 1, wherein the inner converging lens includes a thickness T and the adapter lens has a length H, and the ratio of the thickness T to the length H is less than 0.4.

25. The adapter lens of claim 1, wherein the inner converging lens includes a thickness T and the adapter lens has a length H, and the ratio of the thickness T to the length H is less than 0.25.

26. The adapter lens of claim 1, wherein the inner converging lens part includes a diameter d and the adapter lens includes a maximum diameter MD, and the ratio between the diameter d to the maximum diameter MD is less than 0.5.

27. The adapter lens of claim 1, wherein the inner converging lens part includes a diameter d and the adapter lens includes a maximum diameter MD, and the ratio between the diameter d to the maximum diameter MD is less than 0.46.

28. The adapter lens of claim 1, wherein the inner converging lens part includes a diameter d and the adapter lens includes a maximum diameter MD, and the ratio between the diameter d to the maximum diameter MD is less than 0.42.

* * * * *